(12) United States Patent  (10) Patent No.: US 8,739,644 B2
Singh et al.  (45) Date of Patent: Jun. 3, 2014

(54) EIGHT SPEED DUAL CLUTCH TRANSMISSION

(75) Inventors: Tejinder Singh, Commerce Township, MI (US); Patrick S. Portell, Clarkston, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 8 days.

(21) Appl. No.: 13/551,265

(22) Filed: Jul. 17, 2012

(65) Prior Publication Data

US 2013/0031990 A1 Feb. 7, 2013

Related U.S. Application Data

(60) Provisional application No. 61/515,168, filed on Aug. 4, 2011.

(51) Int. Cl.
*F16H 3/08* (2006.01)

(52) U.S. Cl.
USPC .......................................................... 74/330

(58) Field of Classification Search
USPC ........................... 74/330, 331, 333, 339, 340
See application file for complete search history.

(56) References Cited

U.S. PATENT DOCUMENTS

| | | | | |
|---|---|---|---|---|
| 7,621,195 | B2 * | 11/2009 | Hattori | 74/331 |
| 8,464,599 | B2 * | 6/2013 | Ross et al. | 74/330 |
| 2008/0134818 | A1 * | 6/2008 | Gitt | 74/330 |
| 2010/0294057 | A1 * | 11/2010 | Sowul | 74/330 |
| 2010/0294058 | A1 * | 11/2010 | Singh et al. | 74/330 |
| 2010/0319473 | A1 * | 12/2010 | Singh et al. | 74/331 |

* cited by examiner

*Primary Examiner* — Ha D Ho

(57) ABSTRACT

A transmission is connectable to an input member and includes an output transfer gear, first and second shaft members, first, second and third countershaft members, a plurality of co-planar gear sets, and a plurality of torque transmitting devices. The torque transmitting devices include a plurality of gears, synchronizer assemblies and a dual clutch assembly. The transmission is operable to provide at least one reverse speed ratio and a plurality of forward speed ratios between the input member and the output member.

20 Claims, 1 Drawing Sheet

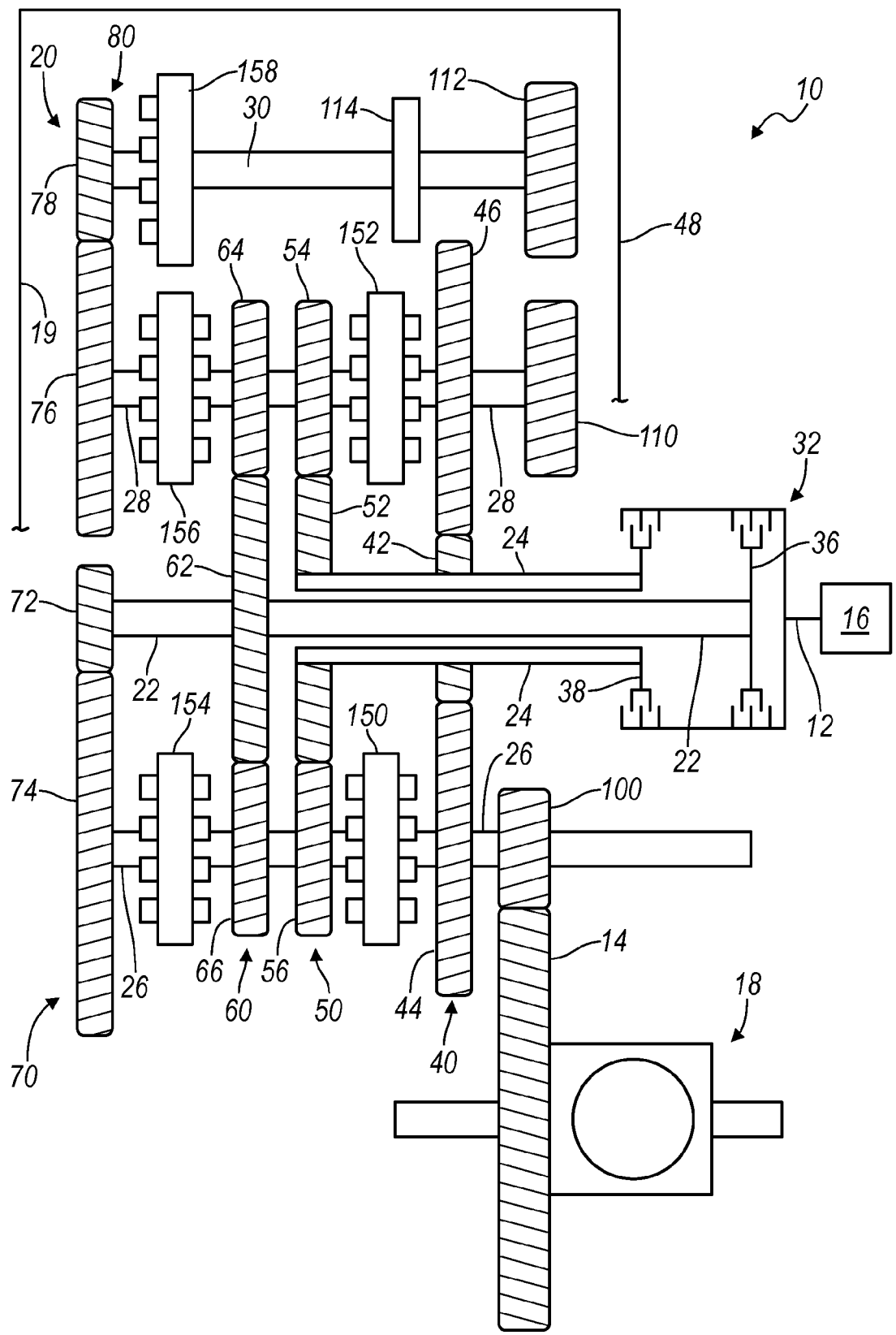

EIGHT SPEED DUAL CLUTCH TRANSMISSION

CROSS-REFERENCE

This application claims the benefit of U.S. Provisional Application No. 61/515,168, filed Aug. 4, 2011. The entire contents of the above application are incorporated herein by reference.

TECHNICAL FIELD

The present disclosure relates to transmissions and more particularly to a compact, dual clutch multiple speed transmission having at least three countershafts to establish eight or more gear speeds.

BACKGROUND

The statements in this section merely provide background information related to the present disclosure and may or may not constitute prior art.

A typical multiple speed transmission having countershafts and co-planar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a transmission is connectable to an input member and includes an output member, first and second shaft members, first, second and third countershaft members, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output member.

In another aspect of the present invention, the transmission includes a transmission housing.

In another aspect of the present invention, the transmission includes a dual clutch assembly having a first clutch, second clutch, and a clutch housing connectable to an engine output member. The clutch housing is rotationally supported within the transmission housing.

In another aspect of the present invention, the transmission includes a first, second, third, fourth and fifth gear set in four planes.

In another aspect of the present invention, the transmission includes a first transmission input member rotatably supported in the transmission housing.

In another aspect of the present invention, the transmission includes a second transmission input member rotatably supported in the transmission housing. The second transmission input member is concentric with the first transmission input member and at least partially surrounds the first transmission input member. The selective engagement of the second clutch of the dual clutch assembly transfers torque form the clutch housing to the second transmission input member.

In another aspect of the present invention, the transmission includes first, second and third countershafts each rotatably supported within the transmission housing and spaced apart from and parallel with the first and second transmission input members.

In another aspect of the present invention, the transmission includes five synchronizer assemblies for selectively coupling at least one of the gears of the first, second, third, fourth and fifth gear sets with at least one of the first, second and third countershafts.

In another aspect of the present invention, the selective engagement of the first and second clutches of the dual clutch assembly interconnects the dual clutch housing with at least one of the first and the second transmission input members and the selective engagement of at least one of the five synchronizer assemblies establishes at least one of eight forward speed ratios.

The above features and advantages and other features and advantages of the present invention are readily apparent from the following detailed description of the best modes for carrying out the invention when taken in connection with the accompanying drawings wherein like reference numbers refer to the same component, element or feature.

BRIEF DESCRIPTION OF THE DRAWINGS

The FIGURE is a schematic view of an embodiment of an eight speed transmission having a dual clutch, two transmission input shafts, three countershafts, a plurality of gear sets and a plurality of synchronizers, in accordance with the present invention.

DESCRIPTION

Referring to the FIGURE, a multiple speed transmission is generally indicated by reference number 10. The transmission 10 is connectable to an input member 12 and has an output member or gear 14. In the present embodiment, the input member 12 is a shaft and the output member 14 is a gear, however those skilled in the art will appreciate that the input member 12 may be components other than shafts and the output member 14 may be a component, such as a shaft, other than a gear.

The input member 12 is continuously connected with an engine 16 or other torque producing machine to provide a driving torque to input member 12. The output member or gear 14 rotatably drives a differential assembly 18. The differential assembly 18 transfers torque delivered by output member 14, ultimately, to a pair road wheels (not shown).

The transmission 10 includes a housing 19 that at least partially encloses a gearing arrangement 20. The gearing arrangement 20 includes various shafts or members, co-planar intermeshing gear sets, a dual clutch assembly, and selectively engageable synchronizers, as will be described herein. For example, the gearing arrangement 20 includes a first transmission input shaft or member 22, a second transmission input shaft or member 24, a first countershaft 26, a second countershaft 28 and a third countershaft 30. The second transmission input shaft or member 24 is a hollow shaft that is concentric with and overlies the first transmission input shaft or member 22. The first countershaft 26, the second countershaft 28 and the third countershaft 30 are each spaced apart from and parallel with the first and second transmission input shaft members 22, 24. The first and second transmission input shafts 22, 24 define a first axis of rotation, the first countershaft 26 defines a second axis of rotation, the second countershaft 28 defines a third axis of rotation and the third countershaft 30 defines a fourth axis of rotation. The position and location of countershafts 26 and 28 relative to first and second transmission input shafts 22, 24 are interchangeable.

A dual clutch assembly 32 is connectable between the input member 12 and the first and second transmission input shaft members 22, 24. The dual clutch assembly 32 includes a clutch housing 34 connectable for common rotation with the input member 12. Further, the dual clutch assembly 32 has first and second clutch elements or hubs 36 and 38. Clutch elements 36 and 38 together with the clutch housing 34 are configured to form a friction clutch, as is known in the art as a dual clutch. More specifically, clutch elements 36, 38 and the clutch housing 34 have friction plates mounted thereon or otherwise coupled thereto that interact to form a friction clutch. The clutch element 36 is connected for common rotation with the first transmission input shaft or member 22 and the clutch element 38 is connected for common rotation with the second transmission input shaft or member 24. Thus, selective engagement of clutch element 36 with the clutch housing 34 connects the input member 12 for common rotation with the first transmission input shaft member 22. Selective engagement of clutch element 38 with the clutch housing 34 connects the input member 12 for common rotation with the second transmission input shaft member 24. It should be appreciated that while the dual clutch assembly 32 is shown in the Figure as a wet clutch assembly, the dual clutch assembly 32 may be a dry clutch assembly without departing from the scope of the present invention.

The gearing arrangement 20 also includes a plurality of co-planar, meshing gear sets 40, 50, 60, 70 and 80. The present invention contemplates that the plurality of co-planar, meshing gear sets 40, 50, 60, 70 and 80 may be arranged axially along transmission input shafts 22, 24 in an order other than that which is shown in the FIGURE and still be within the scope of the invention. Co-planar gear set 40 includes a first pinion gear 42, a second pinion gear 44 and third pinion gear 46. First pinion gear 42 is rotatably fixed and connected for common rotation with the second transmission input shaft member 24 and meshes with second pinion gear 44 and third pinion gear 46. Second pinion gear 44 is selectively connectable for common rotation with the first countershaft member 26. It should be appreciated that first pinion gear 42 may be a separate gear structure fixed to the second transmission input shaft member 24 or gear teeth/splines formed on an outer surface of the second transmission input shaft member 24 without departing from the scope of the present invention. Third pinion gear 46 is selectively connectable for common rotation with the second countershaft member 28. Gear set 40 is disposed proximate a wall 48 of the transmission housing 19 that is on a front or side of the transmission 10 proximate the dual clutch assembly 32.

Co-planar gear set 50 includes first pinion gear 52, second pinion gear 54 and third pinion gear 56. First pinion gear 52 is rotatably fixed and connected for common rotation with the second transmission input shaft member 24 and meshes with second pinion gear 54 and third pinion gear 56. Second pinion gear 54 is selectively connectable for common rotation with the second countershaft member 28. Third pinion gear 56 is selectively connectable for common rotation with the first countershaft member 26. Gear set 50 is positioned adjacent gear set 40.

Co-planar gear set 60 includes first pinion gear 62, second pinion gear 64 and third pinion gear 66. First pinion gear 62 is rotatably fixed and connected for common rotation with the first transmission input shaft member 22 and meshes with second pinion gear 64 and third pinion gear 66. Second pinion gear 64 is selectively connectable for common rotation with the second countershaft member 28. Third pinion gear 66 is selectively connectable for common rotation with the first countershaft member 26. Gear set 60 is disposed adjacent gear set 50.

Co-planar gear set 70 includes first pinion gear 72 and second pinion gear 74. First pinion gear 72 is rotatably fixed and connected for common rotation with the first transmission input shaft member 22 and meshes with second pinion gear 74. Second pinion gear 74 is selectively connectable for common rotation with the first countershaft member 26. Gear set 70 is positioned adjacent gear set 60.

Aligned along the same plane as defined by gear set 70, transmission 10 also includes a gear set 80. Gear set 80 includes a reverse gear 76 and pinion gear 78. Reverse gear 76 is selectively connectable for common rotation with the second countershaft member 28 and meshes with pinion gear 78 and second pinion gear 74 of gear set 70. Pinion gear 78 is selectively connectable for common rotation with the third countershaft member 30.

Further, a first countershaft transfer gear 100 is rotatably fixed and connected for common rotation with the first countershaft member 26. A second countershaft transfer gear 110 is rotatably fixed and connected for common rotation with the second countershaft member 28. A third countershaft transfer gear 112 is rotatably fixed and connected for common rotation with the third countershaft member 30. First countershaft transfer gear 100 is configured to mesh with output member 14, the second countershaft transfer gear 110 is configured to mesh with output member 14 and third countershaft transfer gear 112 is configured to mesh with output member 14. However, the first countershaft transfer gear 100, the second countershaft transfer gear 110 and third countershaft transfer gear 112 do not mesh with each other.

A park gear 114 is provided for placing transmission 10 in a park mode that prevents output member 14 from rotating. The park gear is shown rotationally fixed to third countershaft 30, however, park gear 114 may be rotationally fixed to the first or second countershaft members 26, 28 as well. Moreover, the axial location of the park gear along the first, second or third countershaft members 26, 28 or 30 may be changed in accordance with available packaging space.

With continued reference to the FIGURE, the transmission 10 further includes a plurality of selectively engageable synchronizer assemblies 150, 152, 154, 156 and 158. Synchronizers 150, 152, 154 and 156 are double sided synchronizers and generally include a shift fork (not shown) that is bi-directionally translated by an actuator (not shown) into at least two engaged positions and a neutral or disengaged position. In the present embodiment, synchronizer 150 is selectively actuatable to connect gear 44 for common rotation with the first countershaft member 26 and is selectively actuatable to connect gear 56 for common rotation with the first countershaft member 26. Synchronizer 152 is selectively actuatable to connect for common rotation gear 46 with the second countershaft member 28 and is selectively actuatable to connect for common rotation gear 54 with the second countershaft member 28. Synchronizer 154 is selectively actuatable to connect for common rotation gear 66 with the first countershaft member 26 and is selectively actuatable to connect for common rotation gear 74 with the first countershaft member 26. Synchronizer 156 is selectively actuatable to connect for common rotation gear 64 with the second countershaft 28 and is selectively actuatable to connect for common rotation gear 76 with the second countershaft member 28.

Synchronizer 158 is a single sided synchronizer and generally includes a shift fork (not shown) that is bi-directionally translated by an actuator (not shown) into at least one engaged position and a neutral or disengaged position. Synchronizer 158 is selectively actuatable to connect for common rotation gear 78 with the third countershaft member 30.

The transmission 10 is capable of transmitting torque from the input shaft 12 to the output gear member 14 in at least eight forward torque ratios and at least one reverse torque ratio. Each of the forward torque ratios and the reverse torque ratio is attained by selective engagement of the dual clutch assembly 32 and one or more of the synchronizer assemblies 150, 152, 154, 156 and 158. Those skilled in the art will readily understand that a different speed ratio is associated with each torque ratio.

It should be appreciated that each individual gear set 40, 50, 60, 70 and 80 provides one or more forward and/or reverse gear ratios upon selective engagement of the synchronizer assemblies 150, 152, 154, 156 and 158. It should also be appreciated that a particular forward or reverse speed ratio may be achieved by different combinations of synchronizer and associated gear sets without departing from the scope of the present invention.

For example, to establish the reverse torque ratio, clutch element 36 is engaged and synchronizer 156 is activated. Clutch element 36 couples the input member 12 with the first transmission input shaft member 22. Synchronizer 156 connects gear 76 to the second countershaft member 28. More specifically, input torque from the input shaft 12 is transferred through the dual clutch assembly 32 to the first transmission input shaft member 22, through pinion gear 72 to gear 74, through gear 74 to gear 76, from gear 76 to the second countershaft member 28 through synchronizer 156, then to second countershaft transfer gear 110 and from second countershaft transfer gear 110 to the output member 14.

To establish a first forward torque ratio (i.e. a 1st gear), clutch element 36 is engaged and synchronizer 154 is activated. Clutch element 36 couples the input member 12 with the first transmission input shaft member 22. Synchronizer 154 couples gear 74 to the first countershaft member 26. Input torque from the input member 12 is transferred through the dual clutch assembly 32 to the first transmission input shaft member 22 to pinion 72. Pinion 72 transfers torque to gear 74 which transfers the torque to the first countershaft member 26 through synchronizer 154 and from the first countershaft member 26 to first countershaft transfer gear 100 and then from first countershaft transfer gear 100 to the output member 14.

To establish a second forward torque ratio (i.e. a 2nd gear), clutch element 38 is engaged and synchronizer 152 is activated. Clutch element 38 couples the input member 12 to the second transmission input shaft member 24 which rotates pinion 42. Synchronizer 152 couples gear 46 to the second countershaft member 28. Accordingly, input torque from the input member 12 is transferred through the dual clutch assembly 32 to the second transmission input shaft member 24, through pinion 42 to gear 46, from gear 46 to synchronizer 152, from synchronizer 152 to the second countershaft member 28 and from the second countershaft member 28 to the second countershaft transfer gear 110 and the output member 14.

To establish a third forward torque ratio (i.e. a 3rd gear), clutch element 36 is engaged and synchronizer 158 is activated. Clutch element 36 couples the input member 12 to the first transmission input shaft member 22 which rotates pinion 72. Synchronizer 158 couples gear 78 to the third countershaft member 30. Thus, input torque from the input member 12 is transferred through the dual clutch assembly 32 to the first transmission input shaft member 22, through pinion 72 to gear 74, through gear 74 to gear 76, through gear 76 to gear 78, from gear 78 to synchronizer 158, from synchronizer 158 to the third countershaft member 30, from the third countershaft member 30 to the third countershaft transfer gear 112 and then from third countershaft transfer gear 112 to the output member 14.

To establish a fourth forward torque ratio (i.e. a 4th gear), clutch element 38 is engaged and synchronizer 150 is activated. Clutch element 38 couples the input member 12 to the second transmission input shaft member 24 which rotates pinion 42. Synchronizer 150 couples gear 44 to the first countershaft member 26. Thus, input torque from the input member 12 is transferred through the dual clutch assembly 32 to the second transmission input shaft member 24 to pinion 42, then from pinion 42 to gear 44, from gear 44 to synchronizer 150, from synchronizer 150 to the first countershaft member 26, from the first countershaft member 26 to first countershaft transfer gear 100 and then from first countershaft transfer gear 100 to the output member 14.

To establish a fifth forward torque ratio (i.e. a 5th gear), clutch element 36 is engaged and synchronizer 156 is activated. Clutch element 36 couples the input member 12 to the first transmission input shaft member 22 which rotates pinion 62. Synchronizer 156 couples gear 64 to the second countershaft member 28. Input torque from the input member 12 is transferred through the dual clutch assembly 32 to the first transmission input shaft member 22, from first transmission input shaft member 22 to pinion 62, from pinion 62 to gear 64, from gear 64 to the second countershaft member 28 through synchronizer 156 to second countershaft transfer gear 110 and from second countershaft transfer gear 110 to the output member 14.

To establish a sixth forward torque ratio (i.e. a 6th gear), clutch element 38 is engaged and synchronizer 152 is activated. Clutch element 38 couples the input member 12 to the second transmission input shaft member 24 which rotates pinion 52. Synchronizer 152 couples gear 54 to the second countershaft member 28. Thus, input torque from the input member 12 is transferred through the dual clutch assembly 32 to the second transmission input shaft member 24 to pinion 52, then from pinion 52 to gear 54, from gear 54 to synchronizer 152, from synchronizer 152 to the second countershaft member 28, from the second countershaft member 28 to second countershaft transfer gear 110 and then from second countershaft transfer gear 110 to the output member 14.

To establish a seventh forward torque ratio (i.e. a 7th gear), clutch element 36 is engaged and synchronizer 154 is activated. Clutch element 36 couples the input member 12 to the first transmission input shaft member 22 which rotates pinion 62. Synchronizer 154 couples gear 66 to the first countershaft member 26. Input torque from the input member 12 is transferred through the dual clutch assembly 32 to the first transmission input shaft member 22, from first transmission input shaft member 22 to pinion 62, from pinion 62 to gear 66, from gear 66 to the first countershaft member 26 through synchronizer 154 to first countershaft transfer gear 100 and from first countershaft transfer gear 100 to the output member 14.

To establish an eighth forward torque ratio (i.e. an 8th gear), clutch element 38 is engaged and synchronizer 150 is activated. Clutch element 38 couples the input member 12 to the second transmission input shaft member 24 which rotates pinion 52. Synchronizer 150 couples gear 56 to the first countershaft member 26. Thus, input torque from the input member 12 is transferred through the dual clutch assembly 32 to the second transmission input shaft member 24 to pinion 52, then from pinion 52 to gear 56, from gear 56 to synchronizer 150, from synchronizer 150 to the first countershaft member 26, from the first countershaft member 26 to first countershaft transfer gear 100 and then from first countershaft transfer gear 100 to the output member 14.

Again, it should be appreciated that any one of the gear sets of gear sets 40, 50, 60, 70 and 80 may be changed in size and number gear teeth or gear pitch to produce a certain forward and reverse torque ratio without departing from the scope of the present invention.

The present invention contemplates that a variety of torque ratios (i.e., the ratio of torque of the output member 14 to the input member 12) and ratio steps are achievable through the selection of tooth counts of the gears of the transmission 10. The present invention has many advantages and benefits over the prior art. For example, the present configuration provides eight speeds plus a reverse gear ratio with only four co-planar gear sets. Thus, a transmission having a more simplified actuation and control system, reduced mass and cost and improved packaging is achieved.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
a transmission housing;
a dual clutch assembly having a first clutch, second clutch and a clutch housing connectable to an engine output member, wherein the clutch housing is rotationally supported within the transmission housing;
a first, second, third, fourth and fifth gear set, wherein the first gear set includes a first gear in mesh with a second gear and a third gear, the second gear set includes a first gear in mesh with a second gear and a third gear, the third gear set includes a first gear in mesh with a second gear and a third gear, the fourth gear set includes a first gear in mesh with a second gear and the fifth gear set includes a first gear in mesh with a second gear;
a first transmission input member rotatably supported in the transmission housing and wherein each of the first gears of the third and fourth gear sets are rotatably fixed for common rotation with the first transmission input member and wherein the selective engagement of the first clutch of the dual clutch assembly transfers torque from the clutch housing to the first transmission input member;
a second transmission input member rotatably supported in the transmission housing and wherein each of the first gears of the first and second gear sets are rotatably fixed for common rotation with the second transmission input member and wherein the second transmission input member is concentric with the first transmission input member and at least partially surrounds the first transmission input member and wherein the selective engagement of the second clutch of the dual clutch assembly transfers torque form the clutch housing to the second transmission input member;
a first countershaft rotatably supported within the transmission housing and spaced apart from and parallel with the first and second transmission input members, wherein the second gear of the first gear set, the third gear of the second gear set, the third gear of the third gear set and the second gear of the fourth gear set are each selectively connectable for common rotation with the first countershaft;
a second countershaft rotatably supported within the transmission housing and spaced apart from and parallel with the first and second transmission input members, wherein the third gear of the first gear set, the second gear of the second gear set, the second gear of the third gear set and the first gear of the fifth gear set are each selectively connectable for common rotation with the second countershaft;
a third countershaft rotatably supported within the transmission housing and spaced apart from and parallel with the first and second transmission input members, wherein the second gear of the fifth gear set is selectively connectable for common rotation with the third countershaft; and
five synchronizer assemblies for selectively coupling at least one of the gears of the first, second, third, fourth and fifth gear sets with at least one of the first countershaft, the second countershaft and the third countershaft, and wherein the selective engagement of the first and second clutches of the dual clutch assembly interconnects the dual clutch housing with at least one of the first and the second transmission input members and the selective engagement of at least one of the five synchronizer assemblies establishes at least one of a forward or reverse speed ratio.

2. The transmission of claim 1 wherein a first of the five synchronizer assemblies selectively connects the second gear of the first gear set and the third gear of the second gear set to the first countershaft.

3. The transmission of claim 2 wherein a second of the five synchronizer assemblies selectively connects the third gear of the first gear set and the second gear of the second gear set to the second countershaft.

4. The transmission of claim 3 wherein a third of the five synchronizer assemblies selectively connects the third gear of the third gear set and the second gear of the fourth gear set to the first countershaft.

5. The transmission of claim 4 wherein a fourth of the five synchronizer assemblies selectively connects the second gear of the third gear set and first gear of the fifth gear set to the second countershaft.

6. The transmission of claim 5 wherein a fifth of the five synchronizer assemblies selectively connects the second gear of the fifth gear set to the third countershaft.

7. The transmission of claim 1 wherein the first gear set is adjacent the dual clutch assembly, the second gear set is adjacent the first gear set, the third gear set is adjacent the second gear set, the fourth gear set is disposed between the third gear set and an end wall of the transmission housing and the fifth gear set is co-planar with the fourth gear set.

8. The transmission of claim 1 further comprising a first countershaft transfer gear fixed to the first countershaft for common rotation with the first countershaft, a second countershaft transfer gear fixed to the second countershaft for common rotation with the second countershaft and a third countershaft transfer gear fixed to the third countershaft for common rotation with the third countershaft and wherein the first, second and third countershaft transfer gears transfer torque from at least one of the first, second and third countershafts to a transmission output member.

9. The transmission of claim 8 wherein the transmission output member is a gear that meshes with the each of the first, second and third countershaft transfer gears.

10. The transmission of claim 8 further comprising a park gear fixed to the third countershaft for common rotation with the third countershaft wherein the park gear is configured to prevent rotation of the third countershaft and third countershaft transfer gear.

11. The transmission of claim 1 wherein the first, second, third, fourth and fifth gear sets are separate gear sets having separate and distinct gears.

12. A transmission comprising:
   a transmission housing;
   a dual clutch assembly having a first clutch, second clutch and a clutch housing connectable to an engine output member, wherein the clutch housing is rotationally supported within the transmission housing;
   a first, second, third, fourth and fifth gear set, wherein the first gear set includes a first gear in mesh with a second gear, the second gear set includes a first gear in mesh with a second gear and a third gear, the third gear set includes a first gear in mesh with a second gear and a third gear, the fourth gear set includes a first gear in mesh with a second gear, and the fifth gear set includes a first gear in mesh with a second gear;
   a first transmission input member rotatably supported in the transmission housing and wherein each of the first gears of the third and fourth gear sets are rotatably fixed for common rotation with the first transmission input member and wherein the selective engagement of the first clutch of the dual clutch assembly transfers torque from the clutch housing to the first transmission input member;
   a second transmission input member rotatably supported in the transmission housing and wherein each of the first gears of the first and second gear sets are rotatably fixed for common rotation with the second transmission input member and wherein the second transmission input member is concentric with the first transmission input member and at least partially surrounds the first transmission input member and wherein the selective engagement of the second clutch of the dual clutch assembly transfers torque form the clutch housing to the second transmission input member;
   a first countershaft rotatably supported within the transmission housing and spaced apart from and parallel with the first and second transmission input members, wherein the second gear of the first gear set, the third gear of the second gear set, the third gear of the third gear set and the second gear of the fourth gear set are each selectively connectable for common rotation with the first countershaft;
   a second countershaft rotatably supported within the transmission housing and spaced apart from and parallel with the first and second transmission input members, wherein the second gear of the second gear set, the second gear of the third gear set, the second gear of the third gear set and the first gear of the fifth gear set are each selectively connectable for common rotation with the second countershaft;
   a third countershaft rotatably supported within the transmission housing and spaced apart from and parallel with the first and second transmission input members, wherein the second gear of the fifth gear set is selectively connectable for common rotation with the third countershaft;
   a first countershaft transfer gear fixed to the first countershaft for common rotation with the first countershaft;
   a second countershaft transfer gear fixed to the second countershaft for common rotation with the second countershaft;
   a third countershaft transfer gear fixed to the third countershaft for common rotation with the third countershaft;
   a park gear fixed to the third countershaft for common rotation with the third countershaft wherein the park gear is configured to prevent rotation of the third countershaft and third countershaft transfer gear when engaged; and
   five synchronizer assemblies for selectively coupling at least one of the gears of the first, second, third, fourth and fifth gear sets with at least one of the first countershaft, the second countershaft and the third countershaft, and
   wherein the selective engagement of the first and second clutches of the dual clutch assembly interconnects the dual clutch housing with at least one of the first and the second transmission input members and the selective engagement of at least one of the five synchronizer assemblies transfers torque from at least one of the first, second, third, fourth and fifth gear sets to at least one of the first, second and third countershafts and to at least one of the first, second and third countershaft transfer gears to establish at least one of a forward or reverse speed ratio.

13. The transmission of claim 12 wherein a first of the five synchronizer assemblies selectively connects the second gear of the first gear set and the third gear of the second gear set to the first countershaft.

14. The transmission of claim 13 wherein a second of the five synchronizer assemblies selectively connects the third gear of the first gear set and the second gear of the second gear set to the second countershaft.

15. The transmission of claim 14 wherein a third of the five synchronizer assemblies selectively connects the third gear of the third gear set and the second gear of the fourth gear set to the first countershaft.

16. The transmission of claim 15 wherein a fourth of the five synchronizer assemblies selectively connects the second gear of the third gear set and first gear of the fifth gear set to the second countershaft.

17. The transmission of claim 16 wherein a fifth of the five synchronizer assemblies selectively connects the second gear of the fifth gear set to the third countershaft.

18. The transmission of claim 12 wherein the first gear set is adjacent the dual clutch assembly, the second gear set is adjacent the first gear set, the third gear set is adjacent the second gear set, the fourth gear set is disposed between the third gear set and an end wall of the transmission housing and the fifth gear set is co-planar with the fourth gear set.

19. The transmission of claim 12 further comprising a transmission output member, wherein the transmission output member is a gear that meshes with the each of the first, second and third countershaft transfer gears.

20. The transmission of claim 12 wherein the first, second, third, fourth and fifth gear sets are separate gear sets having separate and distinct gears.

* * * * *